(12) United States Patent
Favaretto

(10) Patent No.: US 9,397,324 B2
(45) Date of Patent: Jul. 19, 2016

(54) SYSTEM FOR THE STORAGE OF ELECTRICAL ENERGY FOR A VEHICLE WITH ELECTRIC PROPULSION

(71) Applicant: Ferrari S.p.A., Modena (IT)

(72) Inventor: Fabrizio Favaretto, Formigine (IT)

(73) Assignee: Ferrari S.p.A., Modena (IT)

( * ) Notice: Subject to any disclaimer, the term of this patent is extended or adjusted under 35 U.S.C. 154(b) by 228 days.

(21) Appl. No.: 14/016,681

(22) Filed: Sep. 3, 2013

(65) Prior Publication Data
US 2014/0072840 A1 Mar. 13, 2014

(30) Foreign Application Priority Data
Sep. 4, 2012 (IT) ............................... BO2012A0466

(51) Int. Cl.
| | | |
|---|---|---|
| *H01M 2/12* | (2006.01) | |
| *H01M 2/10* | (2006.01) | |
| *H01M 10/04* | (2006.01) | |
| *H01M 10/6554* | (2014.01) | |
| *H01M 10/613* | (2014.01) | |
| *H01M 10/625* | (2014.01) | |
| *H01M 10/653* | (2014.01) | |

(Continued)

(52) U.S. Cl.
CPC ............... *H01M 2/12* (2013.01); *H01M 2/1077* (2013.01); *H01M 2/1252* (2013.01); *H01M 10/0481* (2013.01); *H01M 10/613* (2015.04); *H01M 10/6554* (2015.04); *H01M 10/625* (2015.04); *H01M 10/647* (2015.04); *H01M 10/653* (2015.04); *H01M 10/6567* (2015.04)

(58) Field of Classification Search
CPC . H01M 10/60; H01M 6/5038; H01M 2/1229; H01M 2/10–2/1294
See application file for complete search history.

(56) References Cited

U.S. PATENT DOCUMENTS

| | | | | |
|---|---|---|---|---|
| 4,265,984 A | * | 5/1981 | Kaye | ............................ 429/178 |
| 2002/0028375 A1 | * | 3/2002 | Morishita | ........... H01M 2/1077 |
| | | | | 429/120 |

(Continued)

FOREIGN PATENT DOCUMENTS

| | | | | |
|---|---|---|---|---|
| JP | 2009170258 A | * | 7/2009 | |
| JP | 2009170258 A | | 7/2009 | |

(Continued)

OTHER PUBLICATIONS

Physics Hyper Textbook (1998). Elasticity. http://physics.info/elasticity.*

(Continued)

*Primary Examiner* — Scott J Chmielecki
(74) *Attorney, Agent, or Firm* — Schwegman Lundberg & Woessner, P.A.

(57) ABSTRACT

A system for the storage of electrical energy for a vehicle with electric propulsion; the storage system presents: at least one group of chemical batteries, which are arranged aligned with one another and each of which presents an upper wall, which is provided with a pair of electrical terminals and with a safety valve, and a lower wall, which is parallel and opposite to the upper wall; a container, which houses the group of chemical batteries; a relief duct, which rests against the upper walls of the chemical batteries and presents, for each safety valve, a corresponding opening, which is coupled to the safety valve; and a cooling element, which is parallel and opposite to the relief duct and rests against the lower walls of the chemical batteries.

8 Claims, 5 Drawing Sheets

(51) Int. Cl.
  *H01M 10/647* (2014.01)
  *H01M 10/6567* (2014.01)

(56) References Cited

U.S. PATENT DOCUMENTS

| 2011/0262799 A1* | 10/2011 | Kim | 429/156 |
| 2011/0293974 A1 | 12/2011 | Yoon et al. | |
| 2012/0021260 A1* | 1/2012 | Yasui et al. | 429/53 |

FOREIGN PATENT DOCUMENTS

| JP | 2010205509 A | | 9/2010 |
| JP | 2010277735 A | * | 12/2010 |
| JP | 2010277735 A | | 12/2010 |
| JP | 2011014321 A | * | 1/2011 |
| WO | WO-2013/038520 A1 | | 3/2013 |

OTHER PUBLICATIONS

Norton (2008). PTFE Film. http://www.norton-films.com/uploadedFiles/SGfilmseu/Documents/PTFEFilms-Capabilities-AFF1603.pdf.*

JP 2011-014321 A English Translation.*

"Italian Application No. B020120466, Italian Search Report mailed Jun. 6, 2013", 8 pgs.

* cited by examiner

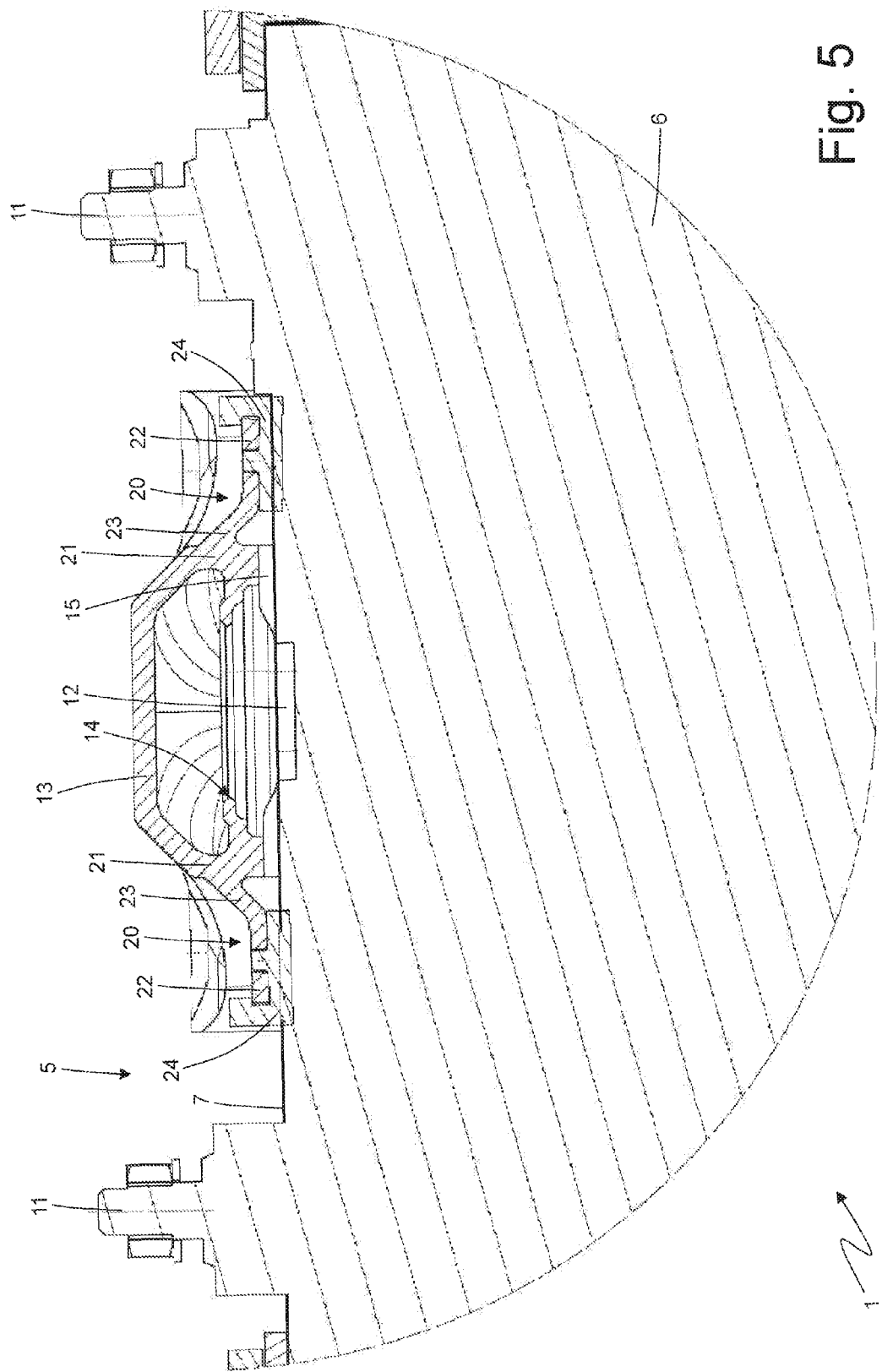

SYSTEM FOR THE STORAGE OF ELECTRICAL ENERGY FOR A VEHICLE WITH ELECTRIC PROPULSION

RELATED APPLICATION

This application claims the benefit of priority, under 35 U.S.C. §119 to Italian Patent Application Serial No. BO2012A 000466, filed on Sep. 4, 2012, which is incorporated herein by reference in its entirety.

TECHNICAL FIELD

The present invention relates to a system for the storage of electrical energy for a vehicle with electric propulsion.

PRIOR ART

Currently, a system for the storage of electrical energy for a vehicle with electric propulsion comprises a plurality of chemical batteries which are arranged beside each other to form a pack, and are generally electrically connected to each other in parallel.

Each chemical battery comprises at least one electrochemical cell and an outer shell, which houses the electrochemical cell by keeping the electrochemical cell compressed, and is made of a material with a high mechanical strength (typically a metal material such as steel or reinforced aluminium). The use was recently proposed of Li-Ion electrochemical cells which have one of the best power-weight ratios, no memory effect, and a slow loss of charge when not in use. However, a Li-Ion electrochemical cell is subject to a destructive phenomenon called thermal shift which is started by a short circuit caused by the decomposition of the individual components of the electrochemical cell (typically following production defects), and stands out for highly exothermic reactions which cause a sudden and high increase in temperature and pressure (in the case of thermal shift the temperature in the outer shell may quickly reach several hundreds of degrees). Hence, to prevent a violent explosion in the case of the thermal shift of a chemical battery, there is a need to relieve the pressure/temperature through a safety valve which is obtained in the outer shell of the chemical battery and opens autonomously; once the safety valve has opened autonomously due to the effect of the thrust of the pressure inside the outer shell, so-called venting consisting of flames, high-temperature gas and melted lithium leaks out of the safety valve. Obviously, there is a need for the storage system to be provided with relief ducts, which connect all the safety valves of the chemical batteries to (at least) one exhaust opening which opens outside the vehicle: thereby, the relief ducts collect the venting and channel the venting outside the vehicle to bring the venting far from the other chemical batteries which are therefore protected (it is indeed imperative to prevent a chain reaction in which the thermal shift of one chemical battery extends to the other adjacent chemical batteries which are struck by venting).

Furthermore, the functioning (both when charging and discharging) of the chemical batteries is exothermic, i.e. determines the generation of heat which is to be adequately expelled to prevent overheating of the chemical batteries. Hence, there is a need for the storage system to be provided with a cooling system which may constantly remove part of the heat generated in the chemical batteries. For example, the cooling system could comprise a cooling plate, which is kept pressed against a wall of the chemical batteries and is thermally connected to a cooling system to expel the heat generated by the chemical batteries.

As it is to comprise both the relief ducts and the cooling system (naturally, in addition to the electrical connections), the storage system is relatively cumbersome and heavy and therefore housing it is more complex inside a vehicle with reduced spaces available for the storage system (particularly in a highly performing road vehicle in which an attempt is made to contain the dimensions to minimize aerodynamic resistance).

Patent Application US20110293974A1 and Patent Application US20120021260A1 describe respective systems for the storage of electrical energy for a vehicle with electric propulsion. Each of these systems for the storage of electrical energy comprises:

a group of chemical batteries, which are arranged aligned with one another and each of which presents an upper wall, which is provided with electrical terminals and with a safety valve, and a lower wall, which is parallel and opposite to the upper wall;

a container, which houses the group of chemical batteries;

a rigid element, which rests against the upper walls of the chemical batteries at the safety valves and presents, for each safety valve, a corresponding opening, which is coupled to the safety valve; and a cooling element, which is parallel and opposite to the rigid element and rests against the lower walls of the chemical batteries, so as to be thermally coupled to the chemical batteries.

However, in the systems for the storage of electrical energy described in Patent Applications US20110293974A1 and US20120021260A1, a relatively frequent premature death (i.e. a breakdown which occurs well in advance of reaching rated life) can occur of certain chemical batteries.

DESCRIPTION OF THE INVENTION

The object of the present invention is to provide a system for the storage of electrical energy for a vehicle with electric propulsion, which is free from the above-described drawbacks and at the same time is easy and affordable to embody.

According to the present invention, a system is provided for the storage of electrical energy for a vehicle with electric propulsion, according to what claimed by the accompanying claims.

BRIEF DESCRIPTION OF THE DRAWINGS

The present invention will now be described with reference to the accompanying drawings, which illustrate a non-limiting embodiment thereof, in which:

FIG. 5 is a view on enlarged scale, of a detail in FIG. 4.

PREFERRED EMBODIMENTS OF THE INVENTION

Figure 1:
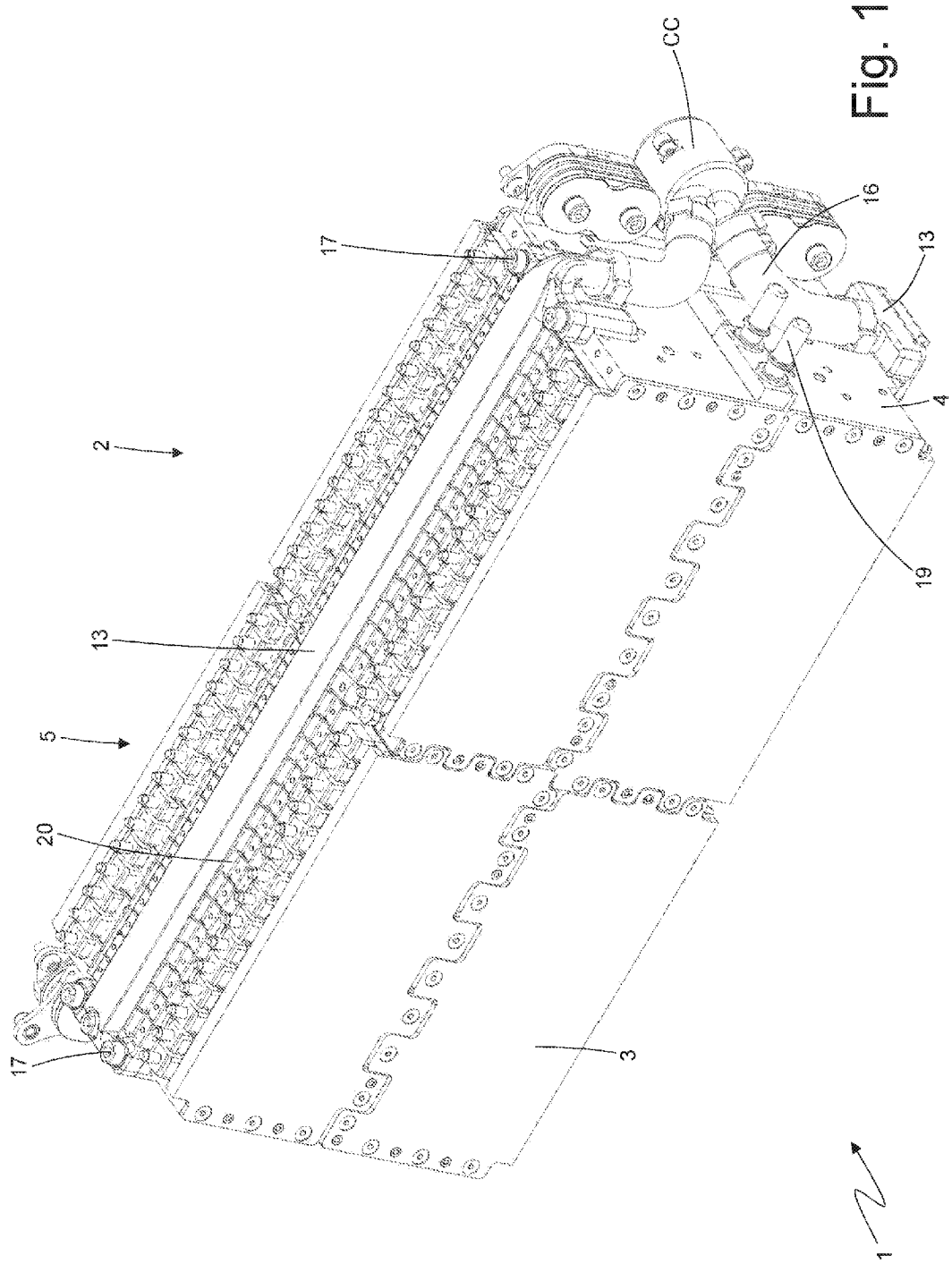
FIG. 1 is a perspective view of a system for the storage of electrical energy for a vehicle with electric propulsion provided in accordance with the present invention.

Numeral 1 in FIG. 1 is a system 1 for the storage of electrical energy for a vehicle with electric propulsion.

Figure 4:
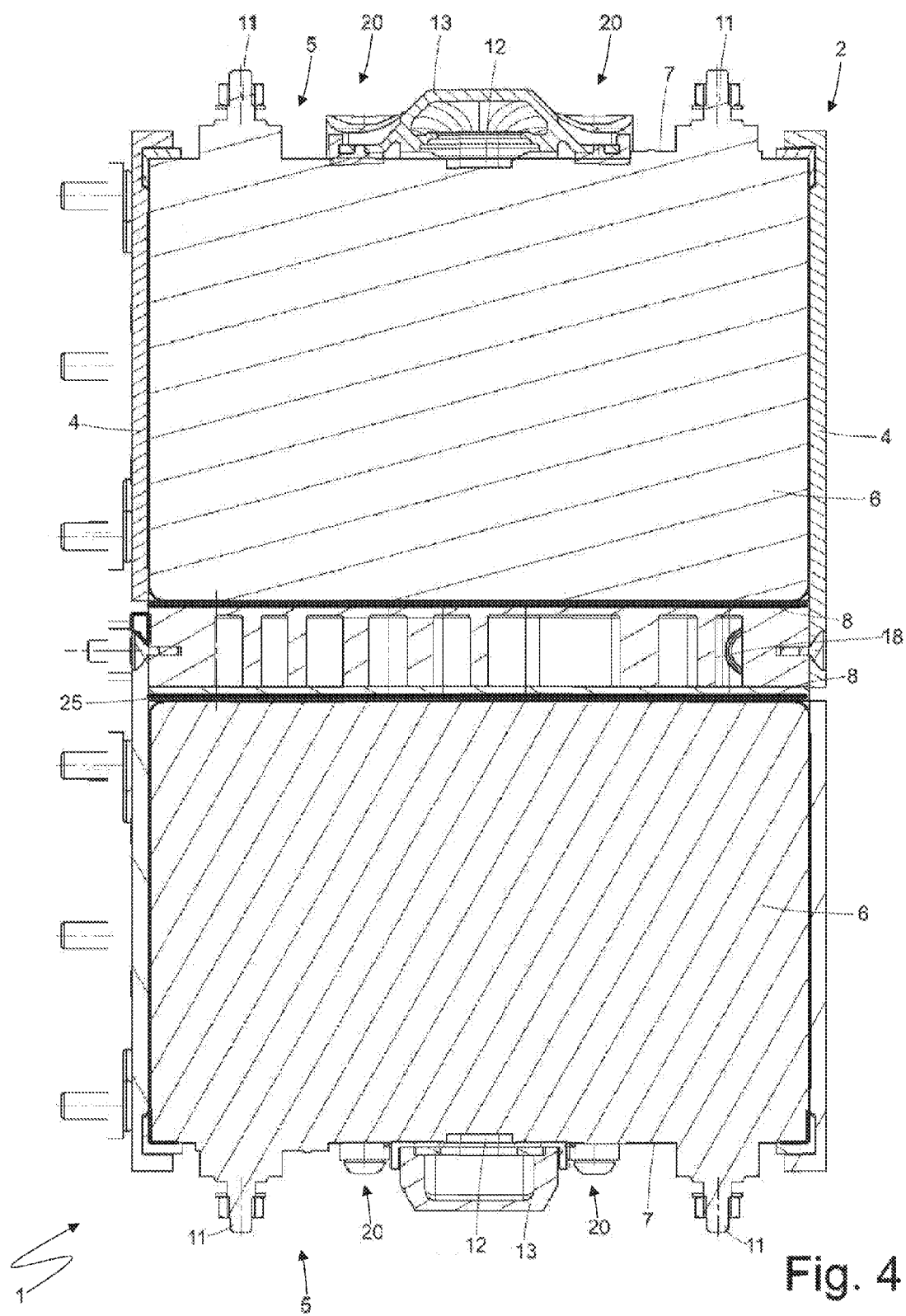
FIG. 4 is a cross-section view of the storage system in FIG. 1.

The storage system 1 comprises a tubular parallelepiped container 2 having two larger lateral walls 3 (only one of which is shown in FIG. 1), two smaller lateral walls 4 (only one of which is shown in FIG. 1), and two open ends (upper and lower, respectively). By way of example, container 2 could be made of a thermally conductive and electrically insulating plastic material. Two groups 5 (only one of which is seen in FIG. 1) of chemical batteries 6 are housed inside container 2, each of which consists of a plurality of chemical batteries 6 arranged in a row. As shown in FIG. 4, the two groups 5 of chemical batteries 6 are arranged one above the other, that is they are overlapping; furthermore, the two groups of chemical batteries 6 present an inverted orientation (opposite), i.e. the upper group 5 of chemical batteries 6 presents an upwards orientation and the lower group 5 of chemical batteries 6 presents a downwards orientation.

Figure 2:
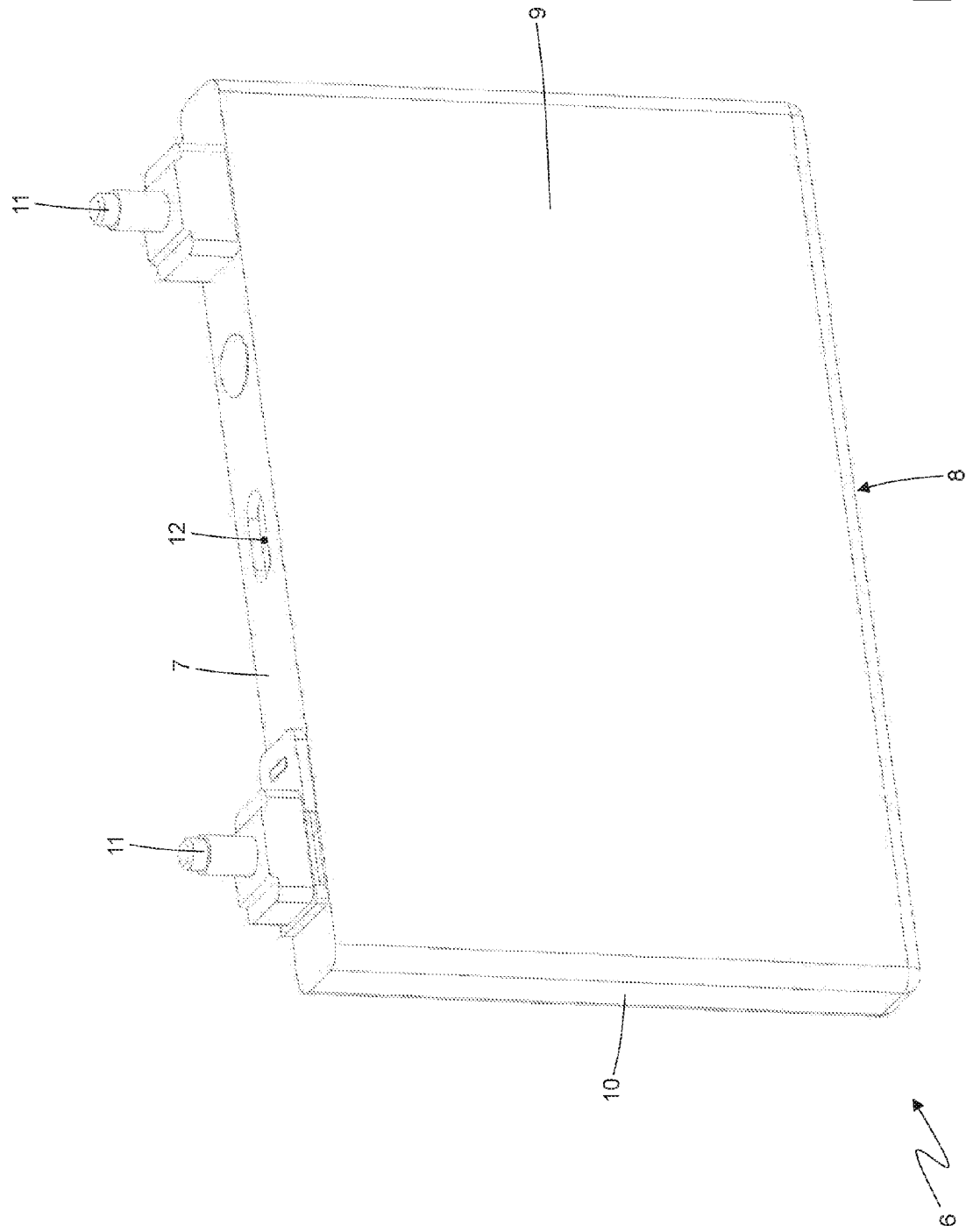
FIG. 2 is a perspective view of the chemical battery of the storage system in FIG. 1.
Figure 3:
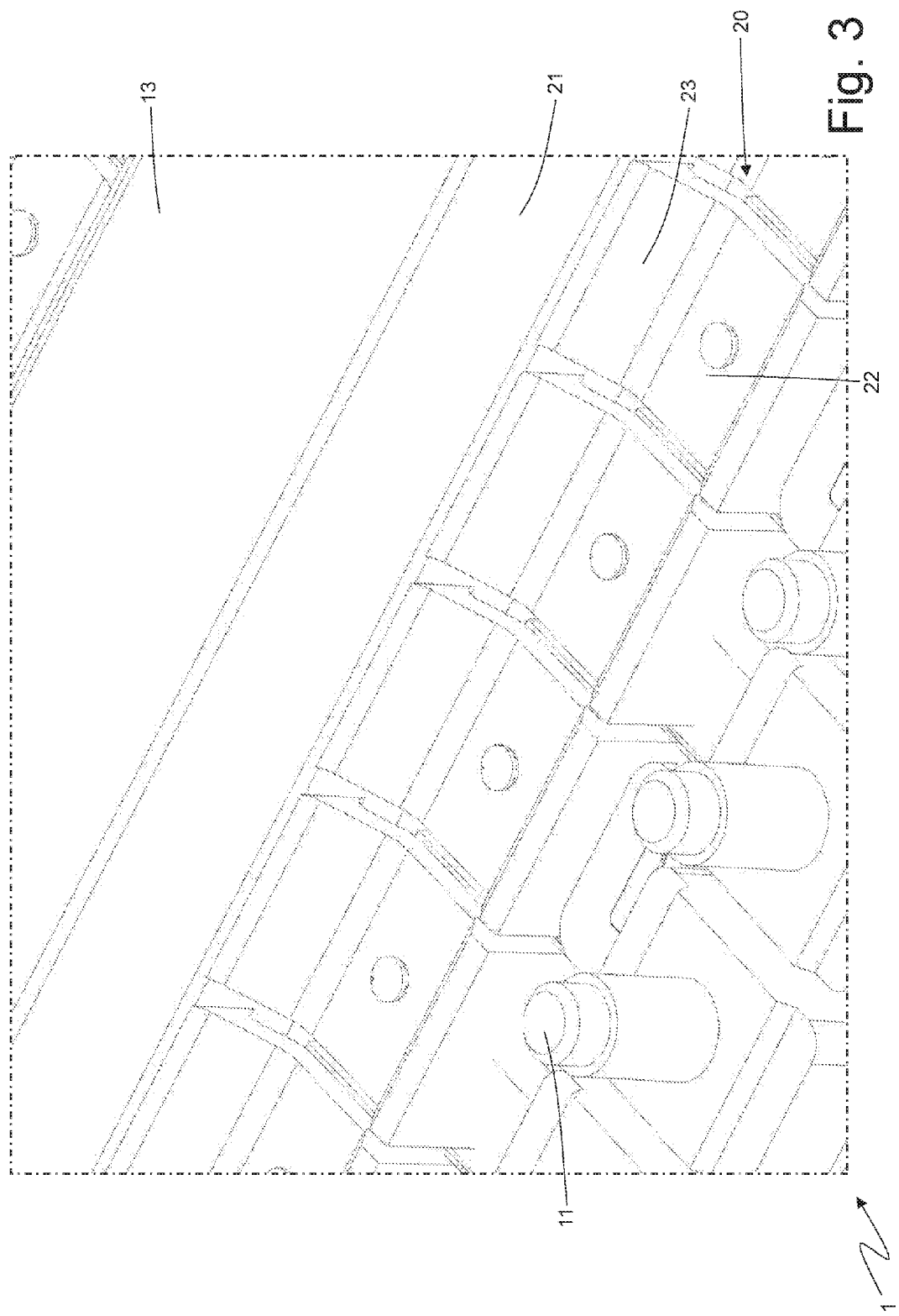
FIG. 3 is a view on enlarged scale, of a detail in FIG. 1.

Each chemical battery 6 comprises at least one electrochemical cell, preferably Li-Ion, and an outer shell, which houses the electrochemical cell by keeping it compressed, and is made of a material with a high mechanical strength (typically a metal material such as steel or reinforced aluminium, but the use is not excluded of composite materials such as carbon fibre). According to what shown in FIG. 2, each chemical battery 6 is substantially parallelepiped in shape and presents an upper wall 7 and a lower wall 8 (not seen in FIG. 2) which are parallel and opposite to each other, a pair of larger lateral walls 9 (only one of which is seen in FIG. 2) which are parallel and opposite to each other, and a pair of smaller lateral walls 10 (only one of which is seen in FIG. 2) which are parallel and opposite to each other.

According to what shown in FIG. 4, the upper walls 7 of the chemical batteries 6 in each group 5 of chemical batteries 6 are arranged at the open ends of container 2 so as to be seen. The larger lateral walls 9 of the chemical batteries 6 are parallel to the smaller lateral walls 4 of container 2, while the smaller lateral walls 10 of the chemical batteries 6 are parallel to the larger lateral walls 3 of container 2. Following the opposite orientation of the two groups 5, the lower walls 8 of the chemical batteries 6 of the upper group 5 of chemical batteries 6 are arranged close to the lower walls 8 of the chemical batteries 6 of the lower group 5 of chemical batteries 6.

Each chemical battery 6 presents a pair of electrical terminals 11 which project from the upper wall 7. Furthermore, each chemical battery 6 presents a safety valve 12 (i.e. a release or overpressure valve) which is arranged on the upper wall 7 between the two electrical terminals 11. Each safety valve 12 is calibrated to open when the pressure in the chemical battery 6 exceeds a predetermined safety pressure; in other words, each safety valve 12 is a mechanical maximum pressure valve which opens when the pressure in the chemical battery 6 is too high to prevent a violent explosion of the chemical battery 6. A Li-Ion electrochemical cell subject to a destructive phenomenon called thermal shift which is started by a short circuit caused by the decomposition of the individual components of the electrochemical cell (typically following production defects) and stands out for highly exothermic reactions which cause a sudden and high increase in temperature and pressure (in the case of thermal shift the temperature in the chemical battery 6 may quickly reach several hundreds of degrees). Hence, in the case of the thermal shift of the chemical battery 6, there is a need to relieve the pressure/temperature by means of the safety valve 12 which opens autonomously, to prevent a violent explosion; once a safety valve 12 has opened autonomously due to the effect of the thrust of the pressure inside the chemical battery 6, so-called venting consisting of flames, high-temperature gas and melted lithium leaks out of the safety valve 12.

According to what shown in FIGS. 1 and 3 to 5, the storage system 1 comprises a pair of relief ducts 13 which are coupled to the corresponding groups 5 of chemical batteries 6. Each relief duct 13 rests against the upper walls 7 of the chemical batteries 6 of the corresponding group 5 and for each safety valve 12 presents a corresponding opening 14 (clearly seen in FIG. 5) coupled to the safety valve 12. Preferably, arranged around each opening 14 of the relief duct 13 is an annular gasket 15 (clearly seen in FIG. 5) which rests, in a sealing manner, against the upper wall 7 of the corresponding chemical battery 6 and around the safety valve 12; the function of the annular gasket 15 is to seal the safety valve 12 to prevent blow-bys of the venting which leaks from the safety valve 12. According to what shown in FIG. 1, each relief duct 13 is made of a rectilinear metal tube (or of another material with a high mechanical strength) which presents a closed end (blind) and an opposite open end which flows into a collecting chamber CC (common to both relief ducts 13) through a coupling tube 16 (the relief duct 13 presents a constant cross section and is typically made by means of extrusion). When the storage system 1 is mounted in a vehicle, the common collecting chamber CC is connected to an exhaust opening which communicates with the outside environment (typically through the bottom of the vehicle) to expel any venting into the outside environment.

The function of each relief duct 13 is to collect and channel the venting to bring the venting far from the other chemical batteries 6 which are therefore protected (it is indeed imperative to prevent a chain reaction in which the thermal shift of one chemical battery 6 extends to the other adjacent chemical batteries 6). Indeed, the venting generated by a chemical battery 6 which has gone into thermal shift is collected and conveyed by the relief duct 13 to be expelled outside the vehicle (and directly onto the surface of the road); thereby, the venting generated by a chemical battery 6 that has gone into thermal shift in no manner at all involves the adjacent chemical batteries 6.

According to what shown in FIG. 1, each relief duct 13 is rigidly connected (restrained) to container 2 and in particular, is fixed to the upper edges of the smaller lateral walls 4 of container 2. Preferably, each relief duct 13 is screwed to the smaller lateral walls 4 of container 2 by means of the screws 17.

According to what shown in FIG. 4, storage system 1 comprises a parallelepiped cooling element 18 which is common to both groups 5 of chemical batteries 6 and is interposed between the groups 5. In other words, the cooling element 18 is interposed between the two groups 5 of chemical batteries 6 so as to be resting on one side against the lower walls 8 of the chemical batteries 6 of the upper group 5, and on the opposite side against the lower walls 8 of the chemical batteries 6 of the lower group 5. Accordingly, the cooling element 18 is parallel and opposite to each relief duct 13 and rests against the lower walls 8 of the chemical batteries 6, so as to be thermally coupled to the chemical batteries 6. The cooling element 18 is thermally connected to an external cooling system to expel the heat generated by the chemical batteries 6; according to what shown in FIG. 1, the cooling element 18 comprises a pair of pipes 19 which come out of a smaller lateral wall 4 of container 2 and are used to circulate a coolant inside the cooling element 18.

Each relief duct 13 rests against the upper walls 7 of the chemical batteries 6 of the corresponding group 5, is rigidly connected to container 2 and is shaped so as to press against the upper walls 7 of the chemical batteries 6 of the corresponding group 5 in order to apply a thrust to the chemical batteries 6, which is perpendicular to the upper walls 7 and keeps the chemical batteries 6 pressed against the cooling element 18. In other words, the two relief ducts 13 push the chemical batteries 6 of the corresponding groups 5 against the cooling element 18 so as to maximize the contact surface and therefore the heat exchange between the cooling element 18 and the lower walls 8 of the chemical batteries 6.

The relief duct 13 comprises a plurality of pressing elements 20, each of which is elastically deformable in a vertical direction which is perpendicular to the upper walls 7 of the chemical batteries 6 and transmits the thrust from the relief duct 13 to the upper walls 7 of the chemical batteries 6. In the embodiment shown in the accompanying figures, the pressing elements 20 are arranged on opposite sides of the relief duct 13 (in essence, the pressing elements 20 are shaped like lateral "legs" of the relief duct 13). Furthermore, in the embodiment shown in the accompanying figures, each pressing element 20 presses against the upper wall 7 of a single corresponding chemical battery 6. According to what shown in FIGS. 3 and 5, each pressing element 20 projects from a lateral wall 21 of the relief duct 13, which is perpendicular to the upper walls 7 of the chemical batteries 6.

Each pressing element 20 comprises an outer body 22, which is parallel and rests against the upper walls 7 of the chemical batteries 6, and a connecting body 23, which is inclined both with respect to the outer body 22, and with respect to the lateral wall 21 of the relief duct 13, and connects the outer body 22 to the lateral wall 21 of the relief duct 13. By projecting from a lateral wall 21 of the relief duct 13, each pressing element 20 has a given vertically direct elasticity (i.e. perpendicular to the upper walls 7 of the chemical batteries 6) so as to elastically press (i.e. with a given "auto-adaptation" capacity) against the upper walls 7 of the chemical batteries 6. The vertical elasticity (i.e. perpendicular to the upper walls 7 of the chemical batteries 6) of the pressing elements 20 is important to uniformly distribute the thrust on all the corresponding chemical batteries 6 thus compensating for inevitable construction tolerances.

According to a preferred embodiment shown in FIG. 5, an insulating layer 24, which is made of an electrically insulating material (preferably in TEFLON—polytetrafluoroethylene), is interposed between the pressing elements 20 and the upper walls 7 of the chemical batteries 6 (i.e. between the outer bodies 22 of the pressing elements 20 and the upper walls 7 of the chemical batteries 6).

According to a preferred embodiment shown in FIG. 4, an insulating layer 25, which is made of an electrically insulating and thermally conductive material, is interposed between the cooling element 18 and the lower walls 8 of the chemical batteries 6 of each group 5.

System 1 for the storage of electrical energy described above has several advantages.

Firstly, system 1 for the storage of electrical energy described above is particularly lightweight and compact. Such a result is obtained due to the fact that one same component (i.e. the relief duct 13) carries out two functions (therefore with apparent savings): its main function of connecting the safety valves 12 to the collecting chamber CC and further function of pushing against the upper walls 7 of the chemical batteries 6 of the corresponding group 5 to keep the chemical batteries 6 pressed against the cooling element 18.

Furthermore, due to the presence of the pressing elements 20, the thrust which is transmitted from the relief duct 13 to the upper walls 7 of the chemical batteries 6 is uniform (i.e. is equal for all the chemical batteries 6); thereby, all the chemical batteries 6 present the same heat exchange with the cooling element 18 and hence are all cooled in the same manner. In other words, the cooling of the chemical batteries 6 is uniform due to the presence of the pressing elements 20 and therefore certain chemical batteries 6 are prevented from cooling worse than others, thus determining a thermal overload which can also cause a premature death (i.e. a breakdown which occurs well in advance of reaching rated life) of the chemical batteries 6.

Finally, above-described system 1 for the storage of electrical energy is simple and affordable to make, because the relief duct 13 is easy to make by means of extrusion and is easy to fasten to container 2 by means of the screws 17.

The invention claimed is:

1. A system for the storage of electrical energy for a vehicle with electric propulsion; the storage system comprising:
   at least one group of chemical batteries, which are arranged aligned with one another and each of which presents an upper wall, which is provided with a pair of electrical terminals and of a safety valve, and a lower wall, which is parallel and opposite to the upper wall;
   a container, which houses the group of chemical batteries;
   a relief duct, which rests against the upper walls of the chemical batteries and, for each safety valve, presents a corresponding opening, which is coupled to the safety valve; and
   a cooling element, which is parallel and opposite to the relief duct and rests against the lower walls of the chemical batteries, so as to be thermally coupled to the chemical batteries themselves;
   wherein an annular gasket is arranged around each opening of the relief duct and rests, in a sealing manner, against the upper wall of the corresponding chemical battery and around the safety valve;
   wherein the relief duct is rigidly connected to the container and is shaped so as to press against the upper walls of the chemical batteries, in order to apply a thrust to the chemical batteries, which is perpendicular to the upper walls and keeps the chemical batteries pressed against the cooling element; and
   wherein the relief duct comprises a plurality of pressing elements, each of which is individually coupled to one of the group of chemical batteries and is elastically deformable in a direction that is perpendicular to the upper walls of the chemical batteries and transmits the thrust from the relief duct to the upper walls of the corresponding chemical battery;
   wherein each pressing element is arranged outside from the annular gasket of the relevant safety valve and projects from a lateral wall of the relief duct perpendicular to the upper walls of the chemical batteries; and
   wherein two separate pressing elements are provided for each chemical battery and arranged on opposite sides of the relevant safety valve without contacting the annular gasket of the safety valve, the pressing elements press the upper wall of the chemical battery in an area arranged laterally from the annular gasket of the safety valve without the interposition of the annular gasket.

2. The storage system according to claim 1, wherein each pressing element presses against the upper wall of a single corresponding chemical battery.

3. The storage system according to claim 1, wherein each pressing element comprises an outer body, which rests against the upper walls of the chemical batteries, and a connecting body, which is inclined and connects the outer body to the lateral wall of the relief duct.

4. The storage system according to claim 1, wherein a first insulating layer, which is made of an electrically insulating material, is interposed between the pressing elements and the upper walls of the chemical batteries.

5. The storage system according to claim 4, wherein the first insulating layer is made of polytetrafluoroethylene.

6. The storage system according to claim 1 and comprising:
   a first group of chemical batteries;
   a second group of chemical batteries, which is arranged under the first group of chemical batteries with an opposite orientation with respect to the first group of chemical batteries, so that the lower walls of the chemical batteries of the first group are arranged close to the lower walls of the chemical batteries of the second group;
   a single cooling element, which is interposed between the two groups of chemical batteries, so as to rest, on one side, against the lower walls of the chemical batteries of the first group and, on the opposite side, against the lower walls of the chemical batteries of the second group; and
   a pair of relief ducts, which are arranged on opposite sides of the container.

7. The storage system according to claim 1, wherein a second insulating layer, which is made of an electrically insulating and thermally conductive material, is interposed between the cooling element and the lower walls of the chemical batteries.

8. The storage system according to claim 1, wherein the cooling element can be thermally connected to a cooling system, so as to expel the heat produced by the chemical batteries.

* * * * *